US009049040B2

(12) United States Patent
Latvakoski (10) Patent No.: US 9,049,040 B2
(45) Date of Patent: Jun. 2, 2015

(54) SYSTEM AND A METHOD FOR REMOTELY USING ELECTRICAL DEVICES (75) Inventor: Juhani Latvakoski, Haukipudas (FI)

(73) Assignee: TEKNOLOGIAN TUTKIMUSKESKUS VTT OY, Vtt (FI)

(*) Notice: Subject to any disclaimer, the term of this patent is extended or adjusted under 35 U.S.C. 154(b) by 159 days.

(21) Appl. No.: 13/519,672

(22) PCT Filed: Dec. 28, 2010

(86) PCT No.: PCT/FI2010/051091
§ 371 (c)(1),
(2), (4) Date: Aug. 20, 2012

(87) PCT Pub. No.: WO2011/080394
PCT Pub. Date: Jul. 7, 2011

(65) Prior Publication Data
US 2012/0324366 A1 Dec. 20, 2012

(30) Foreign Application Priority Data
Dec. 28, 2009 (FI) .................................. 20096399

(51) Int. Cl.
*G06F 3/048* (2013.01)
*H04L 12/28* (2006.01)
*H04L 29/08* (2006.01)
*G06F 3/0481* (2013.01)

(52) U.S. Cl.
CPC .......... *H04L 12/2814* (2013.01); *G06F 3/0481* (2013.01); *H04L 12/2818* (2013.01); *H04L 29/08846* (2013.01); *H04L 67/125* (2013.01)

(58) Field of Classification Search
None
See application file for complete search history.

(56) References Cited

U.S. PATENT DOCUMENTS 5,883,621 A * 3/1999 Iwamura .......................... 725/37
5,886,697 A   3/1999 Naughton et al.
6,480,889 B1 * 11/2002 Saito et al. .................... 709/220
(Continued)

FOREIGN PATENT DOCUMENTS

WO     02/09106 A1    1/2002
WO   2006097861 A2    9/2006
WO   2009008578 A1    1/2009

OTHER PUBLICATIONS

International Search Report, dated Apr. 18, 2011, from corresponding PCT application.
(Continued)

*Primary Examiner* — Matt Kim
*Assistant Examiner* — Daniel Samwel
(74) *Attorney, Agent, or Firm* — Young & Thompson (57) ABSTRACT

A controller device (209) is enabled to provide a virtual user interface of an electrical device (201) to be remotely used and to generate control messages (241) for controlling the electrical device by providing the controller device with a proxy (211) of the electrical device. The proxy is a movable software package which can be used for representing the electrical device in the controller device. The proxy can be configured to have a limited time-to-live in the controller device and/or a surrounding system may have been arranged to send to the controller device a proxy removal message when the corresponding electrical device is leaving the system or a data transfer connection to it has otherwise been lost. Therefore, a sufficiently up-to-date awareness of the electrical devices and a capability of remotely using them can be maintained in the controller device.

27 Claims, 7 Drawing Sheets

(56) References Cited

U.S. PATENT DOCUMENTS

| | | | |
|---|---|---|---|
| 6,487,457 B1* | 11/2002 | Hull et al. | 700/17 |
| 7,200,643 B2* | 4/2007 | Latvakoski et al. | 709/217 |
| 7,418,472 B2* | 8/2008 | Shoemaker et al. | 709/203 |
| 7,631,265 B1 | 12/2009 | Quinn | |
| 7,703,024 B2* | 4/2010 | Kautzleben et al. | 715/749 |
| 8,046,403 B2* | 10/2011 | Mazzaferri | 709/202 |
| 8,654,787 B2* | 2/2014 | Barreto et al. | 370/466 |
| 2002/0143923 A1* | 10/2002 | Alexander | 709/223 |
| 2005/0128048 A1* | 6/2005 | Krzyzanowski et al. | 340/3.71 |
| 2006/0064472 A1 | 3/2006 | Mirho | |
| 2007/0130476 A1 | 6/2007 | Mohanty | |
| 2009/0019058 A1* | 1/2009 | Jung et al. | 707/10 |
| 2009/0157886 A1 | 6/2009 | Lee et al. | |
| 2010/0037300 A1* | 2/2010 | Jin et al. | 726/4 |

OTHER PUBLICATIONS

Finnish Search Report, dated Aug. 20, 2010, from corresponding Finnish application.

Supplementary European Search Report, dated Mar. 8, 2013, from corresponding European application.

* cited by examiner

SYSTEM AND A METHOD FOR REMOTELY USING ELECTRICAL DEVICES

FIELD OF THE INVENTION

The present invention relates to a system in which electrical devices can be remotely used with a separate controller device. Furthermore, the invention relates to a controller device and to an electrical device remotely usable with the controller device. Furthermore, the invention relates to a method for remotely using an electrical device with a controller device, and a method for enabling a controller device to remotely use an electrical device. Furthermore, the invention relates to a computer program for remotely using an electrical device with a controller device and to a computer program for enabling a controller device to remotely use an electrical device.

BACKGROUND

For a human being it can be very difficult or even impossible to configure systems comprising devices and data transfer links therebetween so that it would be possible to control and utilise all or at least a significant portion of available devices and services through a user's terminal, i.e. a controller device, because the number of devices and supported services in such systems is continuously increasing. Especially in conjunction with wireless systems in which devices may leave and join the system quite freely, it is challenging to maintain up-to-date configuration and thus to keep the controller device capable of controlling and using available services and devices. Even though it were possible for a human being to configure a wireless system so that it is possible to control and utilise the available devices and services in a satisfactory manner at a certain instant of time, this would probably not be the case after a while because some wireless data transfer connections would be lost during changing situations and then also the devices and services related to those data transfer connections would not be reachable any more. Therefore, also the interaction between a wireless system and a user of the wireless system may be non-optimal or even problematic, because usually the user's terminal, i.e. the controller device, does not know all the available services provided by the wireless system when the user is using the wireless system. These issues are a subset of a general research challenge called as a complexity explosion, which is still under intensive research and open for novel technical solutions. Due to the above-presented reasons, there is a need for technical solutions which allow automated configuration of devices of wireless systems during changing situations.

There exist a number of technical solutions such as, for example, DNS (Domain Name System) and DHCP (Dynamic Host Configuration Protocol) for identifying names and addresses of devices dynamically joining a wireless system. There exists also a large set of service discovery protocols such as, for example, SLP (Service Location Protocol), UPnP (Universal Plug and Play), Jini (also called Apache River), Bluetooth, and SDP (Service Delivery Platform). The existing technical solutions do not solve the above described problems sufficiently well in all situations because of the inherent dynamics of wireless systems, temporarily missing support from the network infrastructure, e.g breaks in the access to the Internet, occasionally missing presence of devices and services, and very weak support by users of the wireless system.

Publication WO2009008578 discloses a method for configuring a remote controller for a universal plug and play device in a home network. The method is based on constructing a user interface configuration on the basis of functionality of the universal plug and play device and sending the user interface configuration to the remote controller. An inconvenience of the method is that only such user interface configurations can be used which are supported by the existing software and hardware of the remote controller.

Publication US2007130476 discloses a remote controller that operates a user interface specific to a particular target application or device. The remote controller receives information regarding the status or operation of the target application or device, and uses this information to determine information and control options to be presented to a user of the remote controller. The user views the information regarding the target application, and selects desired control actions from among the available control options. The remote controller generates a message according to the performed control actions, and transmits the message to the target device. The target device acts responsive to the control message. The remote controller can provide only such user interfaces which are supported by the existing software and hardware of the remote controller.

Publication WO0209106 discloses a method for providing a user interface in a remote controller. The remote controller receives a user interface description from a data transfer network and displays a user interface based on the user interface description. The remote controller can provide only such user interfaces which are supported by the existing software and hardware of the remote controller.

SUMMARY

In accordance with the first aspect of the present invention, there is provided a new system in which electrical devices can be remotely used, e.g. controlled and/or monitored, with a separate controller device that can be e.g. a wireless user's terminal. The system according to the first aspect of the invention comprises:
  a controller device comprising user interface equipment configurable with software,
  at least one electrical device comprising functional elements or carrying out actions defined by a received control message, the electrical device being capable of transmitting data to the controller device and the controller device being capable of transmitting data to the electrical device, and
  one or more memory devices for storing data,
wherein:
  the one or more memory devices are storing a proxy that is related to the electrical device and includes user interface software and driver software,
  the controller device is arranged to configure its user interface equipment to provide a virtual user interface of the electrical device on the basis of the user interface software of the proxy received at the controller device,
  the controller device is arranged to generate, using the driver software of the proxy, the control message for the electrical device on the basis of a control action given through the virtual user interface, and
  the controller device is arranged to transmit the control message to the electrical device.

In the above-described system the controller device is enabled, by providing the controller device with the proxy of the electrical device, to provide the virtual user interface of the electrical device and to generate control messages for controlling the electrical device. The proxy is a movable software package which can be used for representing the electrical device in another device, e.g. in the controller device. Thus, different variations of the virtual use interface provided by the controller device are not limited and determined by the properties of the own software of the controller device. The proxy may, preferably but not necessarily, comprise further software for enabling the controller device to interpret data formats of messages received at the controller device from the electrical device. The proxy may have been configured to have a limited time-to-live in the controller device or the system may have been arranged to send to the controller device a proxy removal message when the corresponding electrical device is leaving the system or a data transfer connection to it has otherwise been lost. Therefore, a sufficiently up-to-date awareness of the electrical devices and a capability of remotely using them can be maintained in the controller device. The memory device storing the proxy can be e.g. a part of the electrical device to be remotely used or a part of a device distinct from the controller device and the electrical device. Furthermore, it is possible that one part of the proxy, e.g. the user interface software, is stored in one device and another part of the proxy, e.g. the driver software, is stored in another device.

The system may, preferably but not necessarily, further comprise one or more server devices each of which including a memory for storing the proxies of the one or more electrical devices and being arranged to relay data traffic between the controller device and the one or more electrical devices. The server devices may, preferably but not necessarily, be arranged to exchange request and reply messages related to the proxies with each other in order to maintain, in each of the server devices, an up-to-dale database of the proxies. The server devices, the one or more electrical devices, and the controller device can be arranged to exchange search and advertisement messages with each other in order to maintain awareness of data transfer topology of a network constituted by the server devices, the one or more electrical devices, the controller device, and data transfer links therebetween. The network may have, for example, a hierarchical topology in which the controller device constitutes a root node, the one or more electrical devices constitute leaf nodes and the server devices constitute intermediate nodes between the root node and the leaf nodes.

The controller device, the server devices, and the electrical devices to be remotely used can be, for example, arranged to operate as hierarchically organised peers so that the electrical devices are leaf peers, each of which being able to manage only services of its own, and the server devices and the controller device are super peers capable of managing also services of the leaf peers. A super peer can be a child or a parent of some other super peer. In an exemplifying configuration procedure, a leaf peer starts to search for an applicable super peer. The said leaf peer can select any applicable super peer who answers to the search by indicating itself with a super peer advertisement message. After that, the leaf peer advertises itself to the selected super peer. If the super peer approves the leaf peer, the super peer can request for the proxy transfer from the leaf peer to the super peer. The super peer executes the same process as the leaf peer to find a relevant parent-super peer. If such a parent-super peer is found then the proxy is transferred to the parent-super peer and the proxy is included in the registry of the parent-super peer. This exemplifying process of configuring is dynamic and there can be several levels of super peers regarding the parent-child relationship so that the controller device represents the highest level. When a lower level peer goes away it can indicate it to a higher level peer by requesting removal of proxies related to it from the service registry of the higher level peer. The super peers may be arranged to regularly or as a response to predetermined events execute a process of exchanging and updating their service registries. As a result, the information of the available proxies and compositions of the proxies can be stored into several service registries in the system in order to provide a smooth service discovery and to remove problems arising out of a failure in some point of the system. The proxies stored in each super peer can be arranged into nested hierarchical groups so that the grouping corresponds to the child-parent relationships of peers that are child peers for the super peer under consideration. As a result, hierarchical compositions of proxies are maintained in the system.

In accordance with the second aspect of the invention, there is provided a new controller device for remotely using a separate electrical device. The controller device according to the second aspect of the invention comprises user interface equipment configurable with software, a data interface for transmitting and receiving data, and a processing system arranged to:
 configure the user interface equipment to provide a virtual user interface of the electrical device to be remotely used on the basis of a received proxy related to the electrical device to be remotely used, the received proxy including a user interface software for configuring the user interface equipment and driver software for generating control messages for controlling the electrical device to be remotely used,
 generate, using the driver software, a control message on the basis of a control action given through the virtual user interface, and
 transmit the control message to the electrical device to be remotely used.

In accordance with the third aspect of the invention, there is provided a new electrical device which is remotely usable with a separate controller device. The electrical device according to the third aspect of the invention comprises:
 a data interface for transmitting and receiving data, and
 functional elements for carrying out actions defined by a received control message,
 a memory device,
wherein
 data stored in the memory device comprises a proxy including user interface software with the aid of which the controller device is capable of configuring user interlace equipment of the controller device to provide a virtual user interface of the electrical device and driver software with the aid of which the controller device is capable of generating the control message on the basis of a control action given through the virtual user interface, and
 the electrical device is arranged to transmit the proxy via the data interface as a response to a pre-determined situation.

In accordance with the fourth aspect of the invention, there is provided a new method for remotely using an electrical device with a controller device comprising user interface equipment configurable with software. The method according to the fourth aspect of the invention comprises carrying out the following actions at the controller device:
 receiving a proxy related to the electrical device to be remotely used, the proxy including user interface software for configuring the user interface equipment and driver software for generating control messages for controlling the electrical device to be remotely used,
 configuring, using the user interface software, the user interface equipment to provide a virtual user interface of the electrical device to be remotely used, generating, using the driver software, a control message on the basis of a control action given through the virtual user interface, and transmitting the control message to the electrical device to be remotely used.

In accordance with the fifth aspect of the invention, there is provided a new method for enabling a controller device to remotely use an electrical device comprising functional elements for carrying out actions defined by a received control message. The method according to the fifth aspect of the invention comprises:

transmitting to the controller device a proxy including user interface software with the aid of which the controller device is capable of configuring its user interface equipment to provide a virtual user interface of the electrical device and driver software with the aid of which the controller device is capable of generating the control message on the basis of a control action given through the virtual user interface, at the electrical device to be remotely used, receiving from the controller device the control message, and at the electrical device to be remotely used, carrying out actions defined by the control message received In accordance with the sixth aspect of the invention, there is provided a new computer program for remotely using an electrical device with a controller device that comprises a programmable processor and user interface equipment configurable with software. The computer program according to the sixth aspect of the invention comprises computer executable instructions for controlling the programmable processor of the controller device to:

receive a proxy related to the electrical device to be remotely used, the proxy including user interface software for configuring the user interface equipment and driver software for generating control messages for controlling the electrical device to be remotely used, configure, using the user interface software, the user interface equipment to provide a virtual user interface of the electrical device to be remotely used, generate, using the driver software, a control message on the basis of a control action given through the virtual user interface, and transmit the control message to the electrical device to be remotely used.

In accordance with the seventh aspect of the invention, there is provided a new computer program for enabling a controller device to remotely use an electrical device comprising a programmable processor and functional elements for carrying out actions defined by a control message. The computer program according to the seventh aspect of the invention comprises computer executable instructions for controlling the programmable processor of the electrical device to:

transmit to the controller device a proxy including user interface software with the aid of which the controller device is capable of configuring its user interface equipment to provide a virtual user interface of the electrical device and driver software with the aid of which the controller device is capable of generating the control message on the basis of a control action given through the virtual user interface, and control the functional elements to carry out the actions defined by the control message received from the controller device.

A computer program product according to the invention comprises a computer readable medium, e.g. a compact disc (CD), encoded with a computer program according to the invention. Hence, the computer program product can be e.g. a compact disk that contains a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
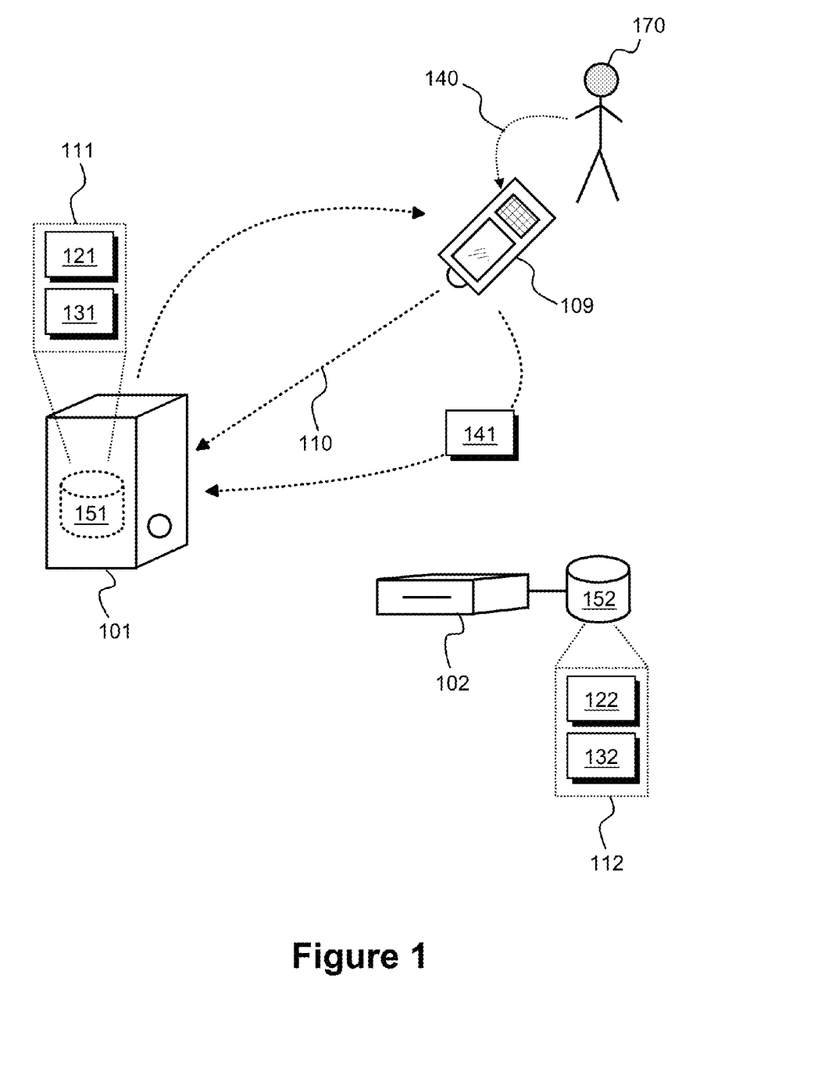
FIG. 1 shows a schematic illustration of a system according to an embodiment of the invention.

FIG. 1 shows a schematic illustration of a system according to an embodiment of the invention. The system comprises a controller device 109 that comprises user interface equipment configurable with software. The user interface equipment may comprise, for example, a touch sensitive screen with the aid of which it is possible to generate different graphical user interfaces. The system comprises electrical devices 101 and 102 that are remotely useable with the aid of the controller deice 109. The electrical devices 101 and 102 comprise functional elements for carrying out predetermined actions. The functional elements may comprise for example a thermometer for measuring the surrounding temperature, a controller for controlling indoor and/or outdoor lights, a smoke sensor, a controller for controlling heating, and/or other sensor and/or actuator elements. Each of the electrical devices 101 and 102 comprises a transceiver capable of transmitting and receiving data to and from the controller device 109. The controller device comprises a transceiver capable of transmitting and receiving data to and from the electrical devices 101 and 102. The electrical device 101 comprises a memory device 151 for storing data. The electrical device 102 is connected to an external memory device 152. The memory device 151 stores a proxy 111 that is related to the electrical device 101 and includes user interface software 121 and driver software 131. The proxy 111 is a movable software package which can be used for representing the electrical device 101 in the controller device 109. The proxy 111 may, preferably but not necessarily, comprise further software for enabling the controller device 109 to interpret data formats of messages received at the controller device from the electrical device 101. The memory device 152 stores a corresponding proxy 112 that is related to the electrical device 102 and includes user interface software 122 and driver software 132. The proxy 112 is a movable software package which can be used for representing the electrical device 102 in the controller device 109. The proxy 112 may, preferably but not necessarily, comprise further software for enabling the controller device 109 to interpret data formats of messages received at the controller device from the electrical device 102.

In the system according to this exemplifying embodiment of the invention, the control device 109 is capable of transmitting to the electrical device 101 a request message via a wireless signalling link 110 between the controller device and the electrical device. The signalling link 110 can be either a direct link or it can be routed via wireless routers. The purpose of the request message 110 is to ask the electrical device 101 to send the proxy 111 to the controller device. The controller device is as well capable of transmitting a similar request message to the electrical device 102. The electrical device 101 is arranged to transmit its proxy 111 to the controller device as a response to receiving the request message via the direct, wireless signalling link 110. Correspondingly, the electrical device 102 is arranged to transmit its proxy 112 to the controller device as a response to receiving a request message from the controller device. The direct, wireless signalling link can be e.g. an infrared or radio link and the request message can be as simple as a pulse of infrared light or radio radiation having a certain frequency and duration. It is also possible to use more developed pointing means with the aid of which a user 170 of the controller device can indicate his/her interest towards one of the electrical devices 101 and 102. An example of such pointing means is disclosed in U.S. Pat. No. 7,110,761. The controller device 109 is arranged to configure its user interface equipment to provide a virtual user interface of the electrical device 101 on the basis of the user interface software 121 of the proxy 111 received at the controller device. The controller device is arranged to generate, using the driver software 131 of the proxy 111, a control message 141 on the basis of a control action 140 given by the user 170 through the virtual user interface, and subsequently transmit the control message 110 to the electrical device 101. The functional elements of the electrical device 101 are arranged to carry out actions defined by the control message 141. The actions can comprise, for example, controlling lights, controlling heating, sending a measured temperature to the controller device, or some other predetermined actions. Hence, the proxy 111 transferred from the electrical device 101 to the controller device 109 enables the user 170 to control the electrical device 101 with the aid of the controller device. Correspondingly, the proxy 112 when transferred to the controller device 109 enables the user 170 to control the electrical device 102 with the aid of the controller device.

Figure 2:
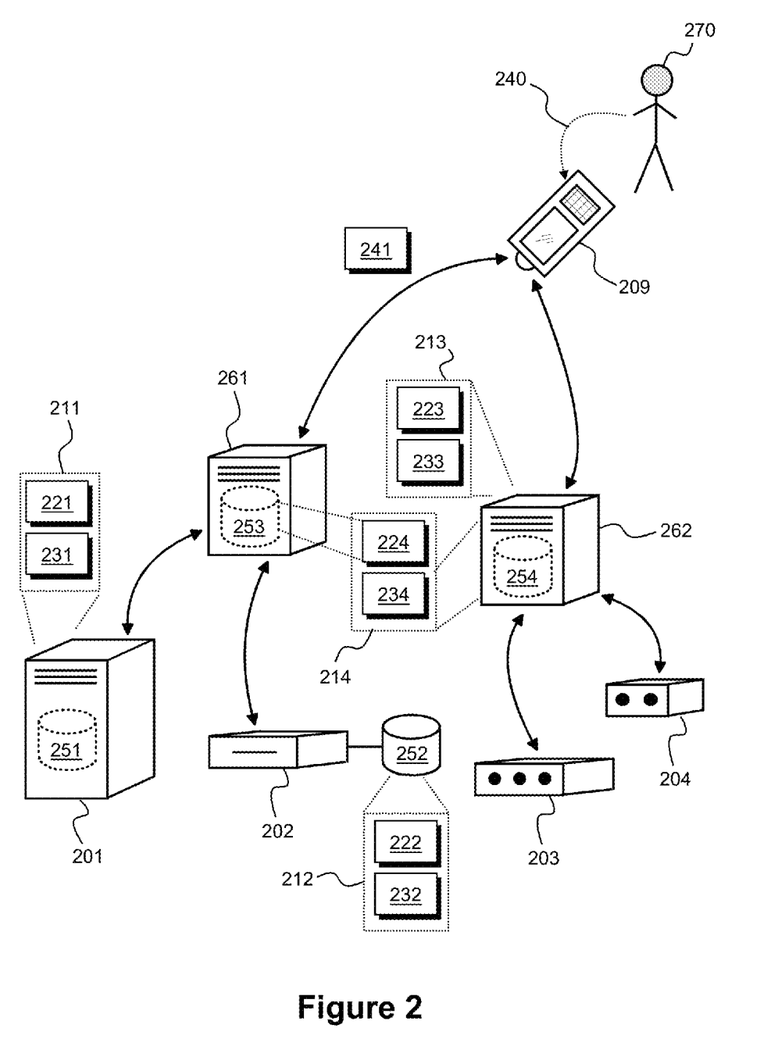
FIG. 2 shows a schematic illustration of a system according to another embodiment of the invention.

FIG. 2 shows a schematic illustration of a system according to another embodiment of the invention. The system comprises a controller device 209 that comprises user interface equipment configurable with software. The system comprises electrical devices 201, 202, 203, and 204 that are remotely useable with the aid of the controller device 209. Each of the electrical devices comprises functional elements for carrying out predetermined actions. The functional elements may comprise for example a thermometer for measuring the surrounding temperature, a controller for controlling indoor and/or outdoor lights, a smoke sensor, a controller for controlling heating, and/or other sensor and/or actuator elements. The system further comprises server devices 261 and 262. The server device 261 is arranged to relay data traffic between the controller device 209 and the electrical devices 201 and 202. The server device 262 is arranged to relay data traffic between the controller device 209 and the electrical devices 203 and 204. The electrical device 201 comprises a memory device 251 that stores a proxy 211. The proxy 211 is a movable software package that comprises user interface software 221 and driver software 231. The user interface 221 software enables the controller device 209 to configure its user interface equipment to provide a virtual user interface of the electrical device 201. The driver software 231 enables the controller device 209 to generate a control message 241 on the basis of a control action 240 given by a user 270 through the above-mentioned virtual user interface. The functional elements of the electrical device 201 are arranged to carry out the actions defined by the control message 241. Hence, the proxy 211 when transferred from the electrical device 201 to the controller device 209 enables the user 270 to control the electrical device 201 with the aid of the controller device. The electrical device 202 is connected to a memory device 252 that stores a proxy 212 related to the electrical device 202 and comprising user interface software 222 and driver software 232. A proxy related to a remotely useable electrical device does not necessarily have to be stored in a memory of the controllable electrical device or in a memory device directly connected to the remotely useable electrical device. For example, a proxy 213 related to the electrical device 203 and comprising user interface software 223 and driver software 233 is stored in a memory device 254 of the server device 262. A proxy 214 related to the electrical device 204 and comprising user interface software 224 and driver software 234 is stored at two distinct locations so that the user interface software 224 is stored in a memory device 253 of the server device 261 and the driver software is stored in the memory device 254 of the server device 262. Each of the proxies may, preferably but not necessarily, comprise further software for enabling the controller device 209 to interpret data formats of messages received at the controller device from the electrical device related to the proxy under consideration.

In a system according to an embodiment of the invention, the server devices 261 and 262 are arranged to exchange request and reply messages related to the proxies of the electrical devices 201-204 with each other in order to maintain, in each of the server devices, an up-to-date database of the proxies. The controller device 209, the server devices 261 and 262, and the electrical devices 201-204 can be arranged to operate as hierarchically organised peers so that the electrical devices 201-204 are leaf peers, each of which being able to manage only services of its own, and the server devices 261 and 262 and the controller device 209 are super peers capable of managing also services of the leaf peers. The server devices are super peers that are child-super peers of the super peer constituted by the controller device, i.e. the controller device 209 is a parent-super peer for the server devices. In an exemplifying configuration procedure, a leaf peer, i.e. one of the electrical devices 201-204, starts to search for an applicable super peer, i.e. one of the server devices 261 and 262. The said leaf peer can select any applicable super peer who answers to the search by indicating itself with a super peer advertisement message. After that, the leaf peer advertises itself to the selected super peer. If the super peer approves the leaf peer, the super peer can request for the proxy transfer from the leaf peer to the super peer. The super peer executes the same process as the leaf peer to find a relevant parent-super peer, i.e. the controller device in the case shown in FIG. 2. If such a parent-super peer is found, then the proxy is transferred to the parent-super peer and the proxy is included in the registry of the parent-super peer. This exemplifying process of configuring is dynamic and there can be several levels of super peers regarding the parent-child relationship so that the controller device 209 represents the highest level. When a lower level peer goes away it can indicate it to a higher level peer by requesting removal of proxies related to it from the service registry of the higher level peer. The super peers may be arranged to regularly or as a response to pre-determined events execute the process of exchanging and updating their service registries. As a result, the information of the available proxies and compositions of the proxies can be stored into several service registries in the system in order to provide a smooth service discovery and to remove problems arising out of a failure in some point of the system. For example, both of the server devices 261 and 262 may have, after the configuring process has taken place, all the proxies 211-214 in its memory. The proxies stored in each super peer, i.e. in the server devices 261 and 262 and in the controller device 209, can be arranged into nested hierarchical groups so that the grouping corresponds to the child-parent relationships of peers that are child peers for the super peer under consideration. As a result, hierarchical compositions of proxies are maintained in the system.

In a system according to an embodiment of the invention, the controller device 209 is arranged to configure its user interface equipment to provide a hierarchical virtual user interface having hierarchical user interface levels corresponding to a hierarchical grouping of the proxies 211-214 relating to the electrical devices 201-204.

In a system according to an embodiment of the invention, the server devices 261 and 262 the electrical devices 201-204, and the controller device 209 are arranged to exchange search and advertisement messages with each other in order to maintain awareness of data transfer topology of a network constituted by the server devices, the electrical devices, the controller device and data transfer links therebetween. The network may have, for example, a hierarchical topology in which the controller device 209 constitutes a root node, the electrical devices 201-204 constitute leaf nodes, and the server devices 261 and 262 constitute intermediate nodes between the root node and the leaf nodes.

In a system according to an embodiment of the invention, one or more of the electrical devices 201-204 is/are arranged to transmit, as a response to receiving a request message, its proxy to a source of the request message. The source of the request message can be one of the server devices 261 and 262 or the controller device 209.

In a system according to an embodiment of the invention, one or more of the electrical devices 201-204 is/are arranged to transmit its proxy via a data transfer connection having a starting point at the electrical device in question as a response to a situation in which the data transfer connection is established. The said data transfer connection may have an end point at one of the server devices or the controller device. In this case, the proxies are distributed automatically when data transfer connections are established.

Figure 3A:
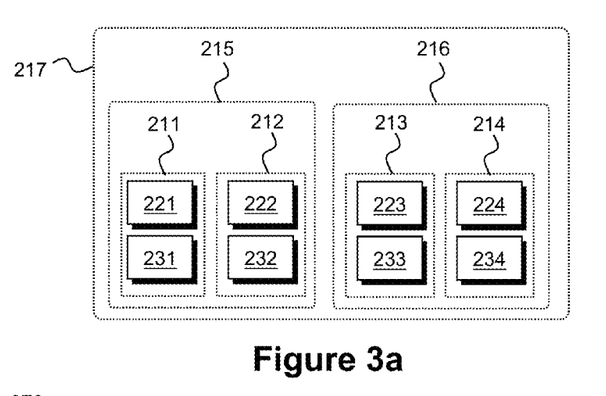
FIG. 3a illustrates an exemplifying, hierarchical arrangement of proxies related to the remotely usable electrical deices of the system shown in FIG. 2.
Figure 3B:
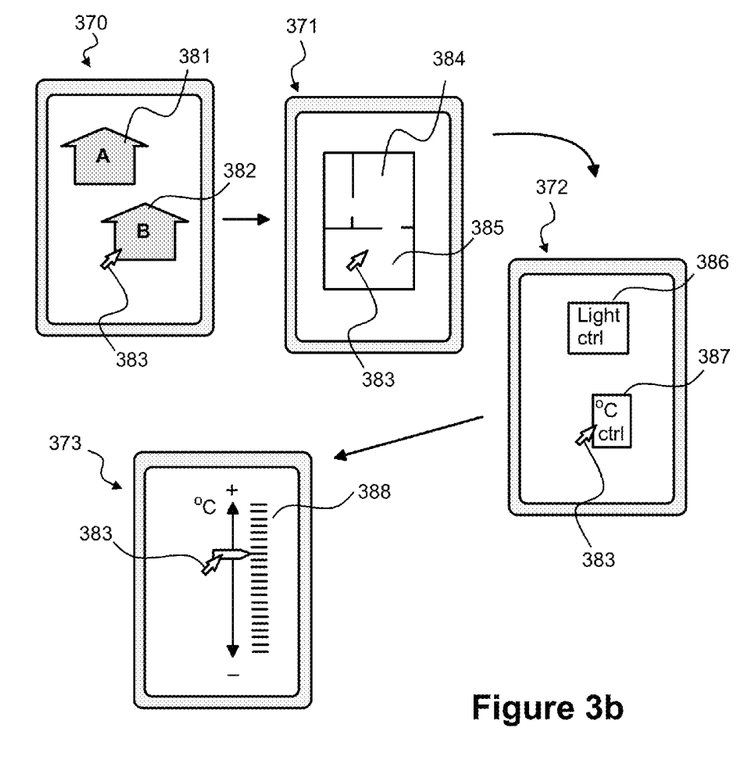
FIG. 3b shows exemplifying, hierarchically arranged virtual user interface levels corresponding to the hierarchical arrangement of the proxies shown in FIG. 3a, FIG. 4 shows a block diagram of a controller device according to an embodiment of the invention.

FIG. 3a illustrates an exemplifying arrangement of proxies 211-214 into nested hierarchical groups 215, 216, and 217. FIG. 3b shows exemplifying, hierarchically arranged virtual user interface levels 370-373 corresponding to the hierarchical arrangement of the proxies shown in FIG. 3a. Each of the virtual user interface levels 370-373 can be displayed on a screen of the user interface equipment of the controller device 209. The virtual user interface level 370 is the topmost level of the hierarchical virtual user interface and the virtual user interface level 373 is the lowest level of the hierarchical virtual user interface. It is possible to have a virtual user interface level presenting a geographical map above the virtual user interface level 370. In the exemplifying situation shown in FIGS. 3a and 3b, is assumed that the electrical devices 201 and 202 are locating in or in the vicinity of a building A and the electrical devices 203 and 204 are locating in or in the vicinity of a building B. Hence, the group 215 of proxies is related to the building A, and the group 216 of proxies is related to the building B. At the beginning the screen of the user interface equipment displays the virtual user interface level 370. The virtual user interface level 370 contains two icons 381 and 382 which represent the buildings A and B, respectively. After the icon 382 representing the building B has been selected using a cursor 383, the screen of the user interface equipment displays the virtual user interface level 371. The virtual user interface level 371 contains a floor plan of the building B which has rooms 384 and 385. After the room 385 has been selected with the cursor 385, the screen of the user Interface equipment displays the virtual user interface level 372. The virtual user interface level 372 contains two icons 386 and 387 which represent the electrical devices located in the room 385. In this exemplifying case, the electrical devices are a controller for controlling lights and a controller for controlling heating. After the icon 387 representing the controller for controlling heating has been selected with the cursor 383, the screen of the user interface equipment displays the virtual user interface level 373. The virtual user interface level 373 contains a sliding control for adjusting the temperature of the room 385.

Figure 4:
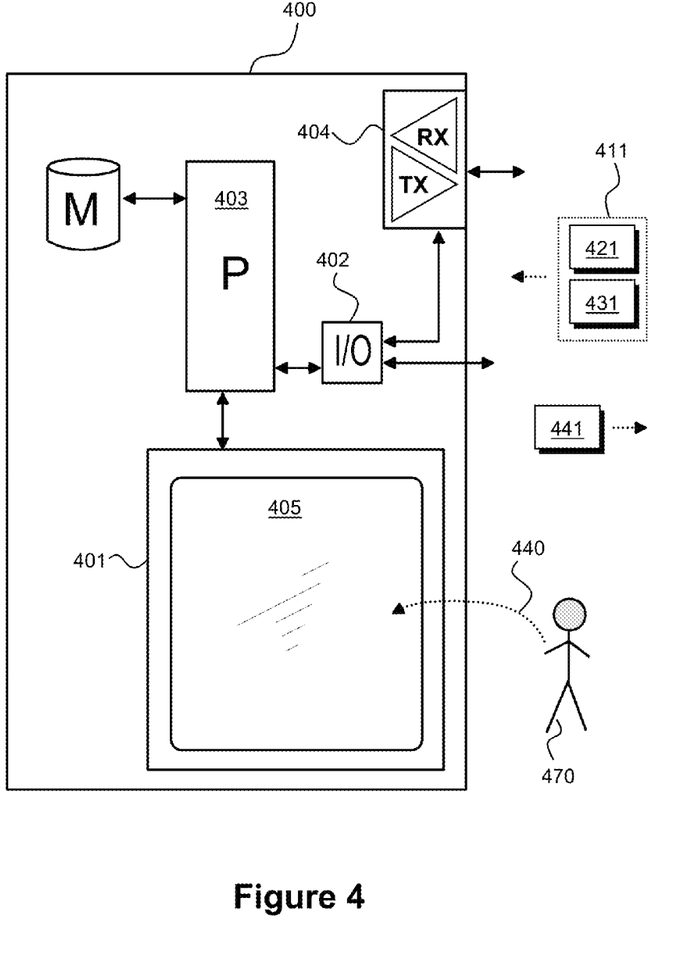

FIG. 4 shows a block diagram of a controller device 400 according to an embodiment of the invention. The controller device comprises user interface equipment 401 configurable with software, a data interface 402 for transmitting and receiving data, and a processing system 403. The processing system may comprise one or more processing units and each processing unit can be a programmable processor, a dedicated circuit, e.g. an ASIC (Application Specific Integrated Circuit), or a configurable circuit, e.g. an FPGA (Field Programmable Gate Array). The processing system is arranged to configure the user interface equipment 401 to provide a virtual user interface of an electrical device to be remotely used on the basis of a received proxy 411 related to the electrical device to be remotely used. The received proxy includes user interface software 421 for configuring the user interface equipment and driver software 431 for generating control messages for controlling the electrical device to be remotely used. The processing system is arranged to generate, using the driver software, a control message 441 on the basis of a control action 440 given by a user 470 through the virtual user interface and to transmit the control message to the electrical device to be remotely used.

In a controller device according to an embodiment of the invention, the processing system 403 is arranged to transmit a request message in order to request the proxy from an external device. The external device can be the electrical device to be controlled or a server device that has an access to the proxy. The request message may contain identifier data of the controller device. This is especially advantageous when same electrical devices are remotely used with many controller devices.

In a controller device according to an embodiment of the invention, the processing system 403 is arranged to transmit the request message via a wireless signalling ink to the electrical device to be remotely used in order to make the electrical device to send the proxy 411.

In a controller device according to an embodiment of the invention, the processing system 403 is arranged to transmit the request message to a server device distinct from the electrical device to be remotely used in order to make the server device to send the proxy.

A controller device according to an embodiment of the invention comprises a transceiver 404 connected to the data interface 402.

In a controller device according to an embodiment of the invention, the data interface 402 is capable of providing data transfer connections to and from an external transceiver device.

In a controller device according to an embodiment of the invention, the user interface equipment 401 comprises a touch sensitive screen 405.

In a controller device according to an embodiment of the invention, the processing system 403 is arranged to configure, as a response to receiving proxies relating to many electrical devices to be remotely used and arranged into nested hierarchical groups, the user interface equipment 401 to provide the virtual user interface as a hierarchical virtual user interface having hierarchically arranged user interface levels corresponding to the hierarchical grouping of the proxies relating to the many electrical devices to be remotely used. The operation in an exemplifying situation is illustrated in FIGS. 3a and 3b.

In a controller device according to an embodiment of the invention, the processing system 403 is arranged to use software contained by the proxy for interpreting a data format of a message received from the electrical device to be remotely used.

Figure 5:
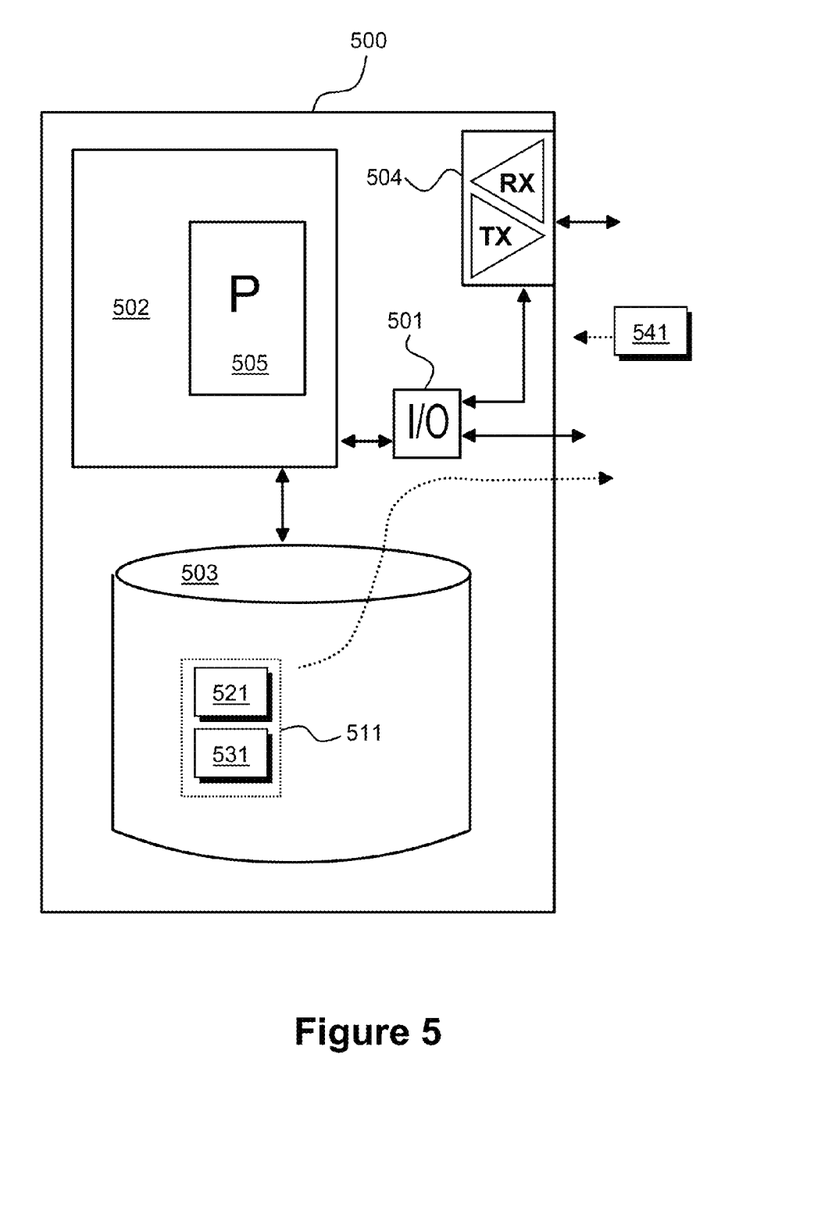
FIG. 5 shows a block diagram of a remotely useable electrical device according to an embodiment of the invention.

FIG. 5 shows a block diagram of a remotely usable electrical device 500 according to an embodiment of the invention. The electrical device comprises a data interface 501 for transmitting and receiving data, a memory device 503 for storing data, and functional elements 502 for carrying out actions defined by a received control message 541. The functional elements may comprise a control processor 505 and actuators and/or sensors connected to the control processor. Data stored in the memory device 503 comprises a proxy 511 including user interface software and driver software 531. The user interface software comprises computer executable instructions for configuring user interface equipment of a separate controller device to provide a virtual user interface of the electrical device. The driver software comprises computer executable instructions for generating, in the controller device, the control message 541 on the basis of a control action given through the above-mentioned virtual user interface.

An electrical device according to an embodiment of the invention is arranged to transmit the proxy 511 as a response to receiving a request message. An electrical device according to an embodiment of the invention is capable of receiving the request message from the controller device via a wireless signalling link between the controller device and the electrical device. An electrical device according to an embodiment of the invention is capable of receiving the request message from a server device distinct from the controller device, the server device being arranged to request and store the proxy and forward the proxy to the controller device directly or via one or more other server devices.

An electrical device according to an embodiment of the invention is arranged to transmit the proxy 511 as a response to a situation in which a data transfer connection from the electrical device to the controller device or a server device is established.

An electrical device according to an embodiment of the invention comprises a transceiver 504 connected to the data interface 501.

In an electrical device according to an embodiment of the invention, the data interface 501 is capable of providing data transfer connections to and from an external transceiver device.

An electrical device according to an embodiment of the invention is arranged to receive an updated version of the proxy from a server device.

Figure 6:
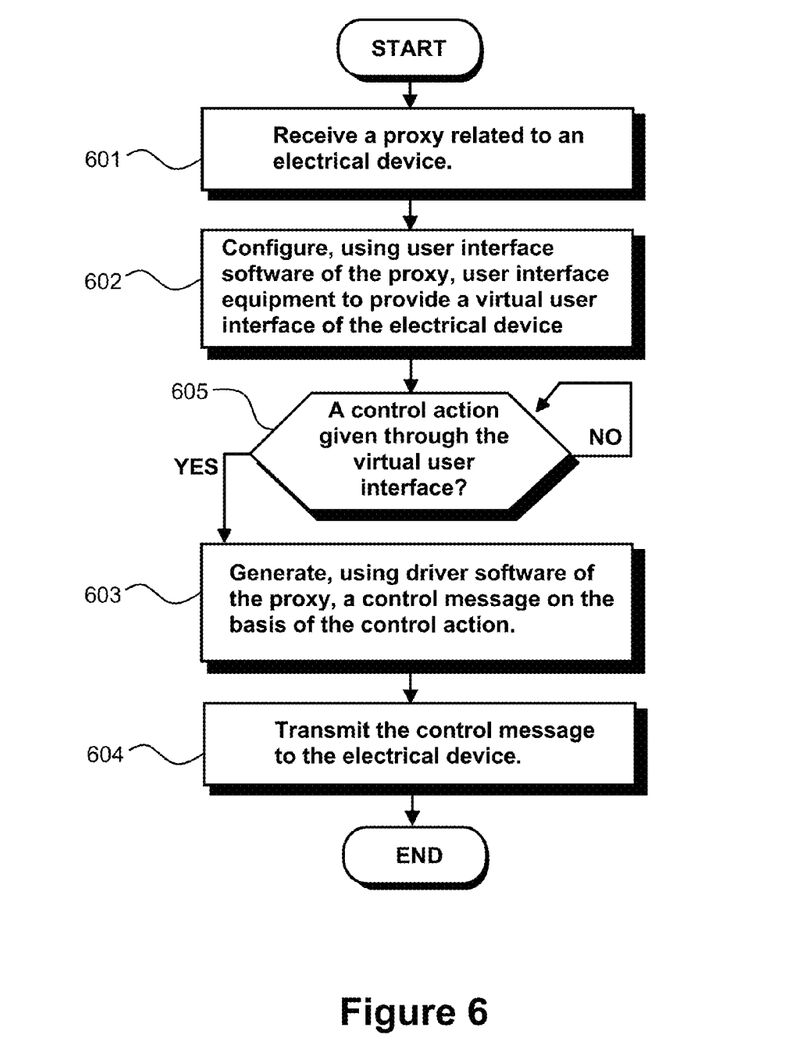
FIG. 6 shows a flow chart of a method according to an embodiment of the invention for remotely using an electrical device with a controller device.

FIG. 6 shows a flow chart of a method according to an embodiment of the invention for remotely using an electrical device with a controller device that comprises user interface equipment configurable with software. The method comprises carrying out the following actions 601-604 at the controller device:

the action 601: receiving a proxy related to the electrical device to be remotely used, the proxy including user interface software for configuring the user interface equipment and driver software for generating control messages for controlling the electrical device to be remotely used, the action 602: configuring, using the user interface software, the user interface equipment to provide a virtual user interface of the electrical device to be remotely used, the action 603: generating, using the driver software, a control message on the basis of a control action 605 given through the virtual user interface, and the action 604: transmitting the control message to the electrical device to be remotely used.

A method according to an embodiment of the invention comprises transmitting, prior to the action 601, a request message from the controller device in order to request the proxy from an external device. In a method according to an embodiment of the invention, the request message contains identifier data of the controller device.

In a method according to an embodiment of the invention, the request message is transmitted from the controller device via a wireless signalling link to the electrical device to be remotely used in order to make the electrical device to be remotely used to send the proxy.

In a method according to an embodiment of the invention, the request message is transmitted from the controller device to a server device distinct from the electrical device to be remotely used in order to make the server device to send the proxy.

Figure 7:
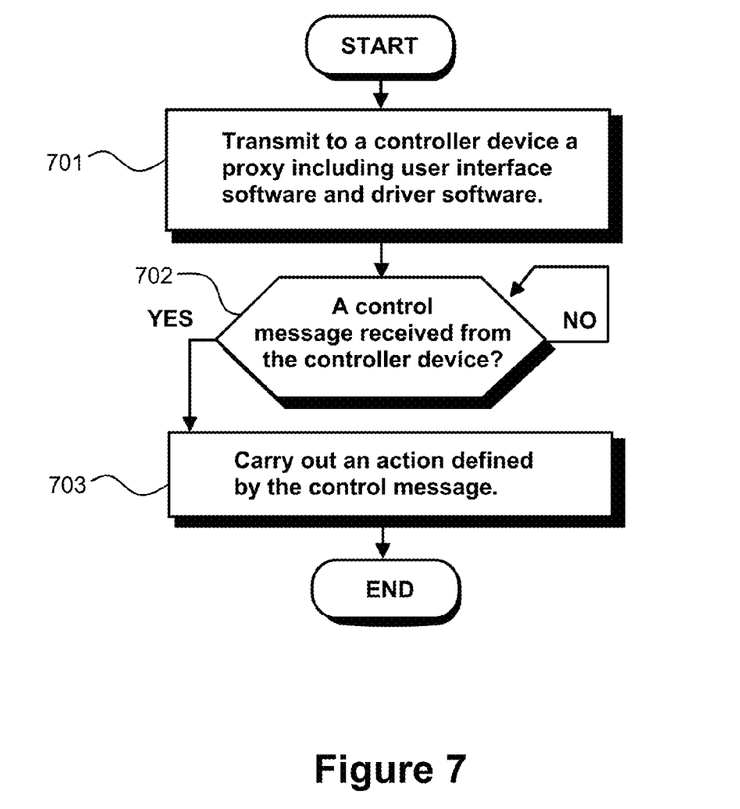
FIG. 7 shows a flow chart of a method according to an embodiment of the invention for enabling a controller device to remotely use an electrical device.

FIG. 7 shows a flow chart of a method according to an embodiment of the invention for enabling a controller device to remotely use an electrical device comprising functional elements for carrying out actions defined by a received control message. The method comprises carrying out the following actions 701-703:

the action 701: transmitting to the controller device a proxy including user interface software with the aid of which the controller device is capable of configuring its user interface equipment to provide a virtual user interface of the electrical device and driver software with the aid of which the controller device is capable of generating the control message on the basis of a control action given through the virtual user interface, the action 702: at the electrical device to be controlled, receiving from the controller device the control message, and the action 703: at the electrical device to be controlled, carrying out actions defined by the control message received.

In a method according to an embodiment of the invention, the proxy is transmitted from the electrical device to the controller device as a response to receiving a request message. In a method according to an embodiment of the invention, the request message is received from the controller device via a wireless signalling link between the controller device and the electrical device. In a method according to an embodiment of the invention, the request message is received from a server device distinct from the controller device, the server device being arranged to request and store the proxy and forward the proxy to the controller device directly or via one or more other server devices.

In a method according to an embodiment of the invention, the proxy is transmitted from the electrical device to the controller device as a response to a situation in which a data transfer connection from the electrical device to at least one of the following is established: the controller device, a server device.

A computer program according to an embodiment of the invention comprises programmatic means for remotely using an electrical device with a controller device comprising a programmable processor and user interface equipment configurable with software. The programmatic means comprise computer executable instructions for controlling the programmable processor of the controller device to:

receive a proxy related to the electrical device to be controlled, the proxy including user interface software for configuring the user interface equipment and driver software for generating control messages for controlling the electrical device to be remotely used, configure, using the user interface software, the user interface equipment to provide a virtual user interface of the electrical device to be remotely used, generate, using the driver software, a control message on the basis of a control action given through the virtual user interface, and transmit the control message to the electrical device to be remotely used.

A computer program according to an embodiment of the invention comprises programmatic means for enabling a controller device to remotely use an electrical device comprising a programmable processor and functional elements for carrying out actions defined by a control message. The programmatic means comprise computer executable instructions for controlling the programmable processor of the electrical device to:

transmit to the controller device a proxy including user interface software with the aid of which the controller device is capable of configuring its user interface equipment to provide a virtual user interface of the electrical device and driver software with the aid of which the controller device is capable of generating the control message on the basis of a control action given through the virtual user interface, and control the functional elements to carry out the actions defined by the control message received from the controller device.

The computer executable instructions can be e.g. subroutines and/or functions.

A computer program product according to an embodiment of the invention comprises a computer readable medium, e.g. a compact disc (CD) or a random access memory device (RAM), encoded with a computer program according to an embodiment of the invention.

A computer program product according to an embodiment of the invention is a signal that is receivable from a communication network and is encoded with a computer program according to an embodiment of the invention.

The specific examples provided in the description given above should not be construed as limiting. Therefore, the invention is not limited merely to the embodiments described above, many variants being possible.

What is claimed is:

1. A controller device (400) comprising:
    user interface equipment (401) configurable with software, and
    a data interface (402) for transmitting and receiving data, wherein the controller device further comprises a processing system (403) arranged to:
    transmit a request message in order to request a proxy (411) from an external device wherein the request message contains identifier data of the controller device that identifies the controller device from other controller devices,
    configure the user interface equipment to provide a virtual user interface of an electrical device to be remotely used on the basis of the received proxy (411) related to the electrical device to be remotely used, the received proxy including user interface software (421) for configuring the user interface equipment and driver software (431) for generating control messages for controlling the electrical device to be remotely used,
    generate, using the driver software, a control message (441) on the basis of a control action (440) given through the virtual user interface, and
    transmit the control message to the electrical device to be remotely used,
    wherein the request message is received by one of plural server devices having respective memory devices (151, 152, 251, 252, 253, 254) for storing data and relaying data traffic between the data interface and the electrical device, each said memory device comprising a database storing the respective proxy of each electrical device connected to each of the server devices so that each proxy is stored in at least two distinct servers, the proxies being stored into nested hierarchical groups corresponding to child-parent relationships, with the electrical devices being children and each server being a parent of the child-parent relationships,
    wherein the proxy of the electrical device is retrievable by the controller device from either of the at least two distinct servers upon receipt of the request message comprising the identifier of the controller device that identifies the controller device sending the request message from other controller devices.

2. A controller device according to claim 1, wherein the processing system is arranged to use software contained by the proxy for interpreting a data format of a message received from the electrical device to be remotely used.

3. A controller device according to claim 1, wherein the processing system is arranged to transmit the request message via a wireless signalling link to the electrical device to be remotely used in order to make the electrical device to be remotely used to send the proxy.

4. A controller device according to claim 1, wherein the processing system is arranged to transmit the request message to a server device distinct from the electrical device to be remotely used in order to make the server device to send the proxy.

5. A controller device according to claim 1, wherein the controller device comprises a transceiver (404) connected to the data interface.

6. A controller device according to claim 1, wherein the data interface is capable of providing data transfer connections to and from an external transceiver device.

7. A controller device according to claim 1, wherein the user interface equipment comprises a touch sensitive screen (405).

8. A controller device according to claim 1, wherein the processing system is arranged to configure, as a response to receiving proxies (211, 212, 213, 214) relating to many electrical devices to be remotely used and arranged into nested hierarchical groups (215, 216, 217), the user interface equipment to provide the virtual user interface as a hierarchical virtual user interface having hierarchically arranged user interface levels (370, 371, 372, 373) corresponding to the hierarchical grouping of the proxies relating to the many electrical devices to be remotely used.

9. An electrical device (500) comprising:
a data interface (501) for transmitting and receiving data,
functional elements (502) for carrying out actions defined by a received control message (541), and
a memory device (503), wherein,
data stored in the memory device comprises a proxy (511) including user interface software (521) with the aid of which a controller device is capable of configuring user interface equipment of the controller device to provide a virtual user interface of the electrical device and driver software (531) with the aid of which the controller device is capable of generating the control message on the basis of a control action given through the virtual user interface, and
the electrical device is connected in as a child in a child-parent relationship to a server, the server being one of plural server devices having respective memory devices (151, 152, 251, 252, 253, 254) for storing data and relaying data traffic between the controller device and the data interface (501) of the electrical device, each said memory device comprising a database storing the respective proxy of each electrical device connected to each of the server devices so that each proxy is stored in at least two distinct servers, the proxies being stored into nested hierarchical groups corresponding to the child-parent relationships of the electrical devices and each server,
wherein the proxy of the electrical device is retrievable from either of the at least two distinct servers upon receipt of a request message comprising an identifier of the controller device that identifies the controller device sending the request message from other controller devices, each server being arranged to transmit the proxy as a response to receiving the request message.

10. An electrical device according to claim 9, wherein the electrical device is arranged to transmit the proxy as a response to a situation in which a data transfer connection from the electrical device to at least one of the following is established: the controller device, a server device.

11. An electrical device according to claim 9, wherein electrical device is capable of receiving the request message from the controller device via a wireless signalling link between the controller device and the electrical device.

12. An electrical device according to claim 9, wherein electrical device is capable of receiving the request message from a server device distinct from the controller device, the server device being arranged to request and store the proxy and forward the proxy to the controller device directly or via one or more other server devices.

13. An electrical device according to claim 9, wherein electrical device is capable of receiving an updated version of the proxy from a server device.

14. A system comprising:
a controller device (109, 209) comprising user interface equipment configurable with software,
wherein the controller device is arranged to transmit a control message comprising an identifier of the controller device that identifies the controller device from other controller devices,
at least one electrical device (101, 102, 201, 202, 203, 204) comprising functional elements for carrying out actions defined by a received control message, the electrical device being capable of transmitting data to the controller device and the controller device being capable of transmitting data to the electrical device, the at least one electrical device comprising a memory device that stores a proxy (211) that is a movable package comprised of a user interface software and a driver software,
wherein the user interface software configures the user interface equipment of the controller device to provide a virtual user interface of the at least one electrical device, the driver software generating, in the controller device, the control message for carrying out actions on the at least one electrical device, on a basis of a control action given by a user through the virtual user interface of the at least one electrical device configured on the controller device, and
plural server devices having respective memory devices (151, 152, 251, 252, 253, 254) for storing data and relaying data traffic between the controller device and the at least one electrical device, each said memory device comprising a database storing the respective proxy of each electrical device connected to each of the server devices so that each proxy is stored in at least two distinct servers, the proxies being stored into nested hierarchical groups corresponding to child-parent relationships, with the electrical devices being children and each server being a parent of the child-parent relationships,
wherein the proxy of the at least one electrical device is retrievable from either of the at least two distinct servers upon receipt of the request message comprising the identifier of the controller device that identifies the controller device sending the request message from other controller devices.

15. A system according to claim 14, wherein the controller device is arranged to use software contained by the proxy for interpreting a data format of a message received from the electrical device.

16. A system according to claim 14, wherein one of the one or more memory devices (151, 152) storing the proxy is a part of the electrical device (101, 102).

17. A system according to claim 14, wherein the server devices are arranged to exchange request and reply messages related to the proxy of the at least one electrical device with each other in order to maintain the database storing the respective proxy of each electrical device, in each of the server devices, as an up-to-date database of the respective proxy of each electrical device.

18. A system according to claim 14, wherein the server devices, the at least one electrical device, and the controller device are arranged to exchange search and advertisement messages with each other in order to maintain awareness of data transfer topology of a network constituted by the server devices, the at least one electrical device, the controller device, and data transfer links there between.

19. A system according to claim 18, wherein the network has a hierarchical topology in which the controller device (209) constitutes a root node, the at least one electrical device (201, 202, 203, 204) constitutes one or more leaf nodes, and the server devices (261, 262) constitute intermediate nodes between the root node and the leaf nodes.

20. A system according to claim 14, wherein the at least one electrical device (101, 102) is arranged to transmit its proxy to the controller device as a response to receiving the request message via a wireless signalling link (110) between the controller device (109) and the electrical device.

21. A system according to claim 14, wherein at least one electrical device is arranged to transmit, as a response to receiving the request message, its proxy to a source of the request message, the source of the request message being one of the following: one of the server devices, the controller device.

22. A system according to claim 14, wherein at least one electrical device is arranged to transmit its proxy via a data transfer connection having a starting point at the electrical device as a response to a situation in which the data transfer connection is established, the data transfer connection having an ending point at one of the following: one of the server devices, the controller device.

23. A system according to claim 14, wherein the controller device is arranged to configure, as a response to receiving proxies (211, 212, 213, 214) relating to many electrical devices (201-204) to be remotely used and arranged into nested hierarchical groups (215, 216, 217), its user interface equipment to provide the virtual user interface as a hierarchical virtual user interface having hierarchically arranged user interface levels (370, 371, 372, 373) corresponding to the hierarchical grouping of the proxies relating to the many electrical devices to be remotely used.

24. A method for remotely using an electrical device with a controller device comprising user interface equipment configurable with software, wherein the method comprises carrying out the following actions at the controller device:
    transmit a request message in order to request a proxy (411) from an external device wherein the request message contains identifier data of the controller device that identifies the controller device sending the request message from other controller devices,
    receiving (601) the proxy related to the electrical device to be remotely used, the proxy including user interface software for configuring the user interface equipment and driver software for generating control messages for controlling the electrical device to be remotely used,
    configuring (602), using the user interface software, the user interface equipment to provide a virtual user interface of the electrical device to be remotely used,
    generating (603), using the driver software, a control message on the basis of a control action given through the virtual user interface, and
    transmitting (604) the control message to the electrical device to be remotely used,
    wherein plural server devices having respective memory devices (151, 152, 251, 252, 253, 254) store data and relay data traffic between the controller device and the electrical device, each said memory device comprising a database storing the respective proxy of each electrical device connected to each of the server devices so that each proxy is stored in at least two distinct servers, the proxies being stored into nested hierarchical groups corresponding to child-parent relationships, with the electrical devices being children and each server being a parent of the child-parent relationships, and
    wherein the proxy of the electrical device is retrievable from either of the at least two distinct servers upon receipt of the request message comprising the identifier of the controller device that identifies the controller device sending the request message from other controller devices.

25. A method for enabling a controller device to remotely use an electrical device comprising functional elements for carrying out actions defined by a control message, wherein the method comprises:
    plural server devices having respective memory devices (151, 152, 251, 252, 253, 254) storing data and relaying data traffic between the controller device and the electrical device, each said memory device comprising a database storing the respective proxy of each electrical device connected to each of the server devices so that each proxy is stored in at least two distinct servers, the proxies being stored into nested hierarchical groups corresponding to child-parent relationships, with the electrical devices being children and each server being a parent of the child-parent relationships, and
    wherein the proxy of the electrical device is retrievable from either of the at least two distinct servers upon receipt of the request message comprising the identifier of the controller device that identifies the controller device sending the request message from other controller devices,
    transmitting (701) to the controller device in response to the receipt of the request message comprising the identifier of the controller device that identifies the controller device from other controller devices, the proxy including user interface software with the aid of which the controller device is capable of configuring its user interface equipment to provide a virtual user interface of the electrical device and driver software with the aid of which the controller device is capable of generating the control message on the basis of a control action given through the virtual user interface,
    at the electrical device, receiving (702) from the controller device the control message, and
    at the electrical device, carrying out (703) actions defined by the control message received.

26. A computer program product embodied on a non-transitory computer readable medium for remotely using an electrical device with a controller device that comprises a programmable processor and user interface equipment configurable with software, wherein the computer program comprises computer executable instructions for controlling the programmable processor of the controller device to:
    receive, in response to a receipt of a request message comprising an identifier of the controller device that identifies the controller device sending the request message from other controller devices, a proxy related to the electrical device to be remotely used, the proxy including user interface software for configuring the user interface equipment and driver software for generating control messages for controlling the electrical device to be remotely used,
    configure, using the user interface software, the user interface equipment to provide a virtual user interface of the electrical device to be remotely used,
    generate, using the driver software, a control message on the basis of a control action given through the virtual user interface, and transmit the control message to the electrical device to be remotely used, wherein the request message is received by one of plural server devices having respective memory devices (151, 152, 251, 252, 253, 254) for storing data and relaying data traffic between the data interface and the electrical device, each said memory device comprising a database storing the respective proxy of each electrical device connected to each of the server devices so that each proxy is stored in at least two distinct servers, the proxies being stored into nested hierarchical groups corresponding to child-parent relationships, with the electrical devices being children and each server being a parent of the child-parent relationships, and wherein the proxy of the electrical device is retrievable by the controller device from either of the at least two distinct servers upon receipt of the request message comprising the identifier of the controller device that identifies the controller device sending the request message from other controller devices.

27. A non-transitory computer readable medium containing thereon a computer program for enabling a controller device to remotely use an electrical device comprising a programmable processor and functional elements for carrying out actions defined by a control message, wherein the computer program comprises computer executable instructions for controlling a programmable processor of a server device to:

transmit to the controller device, in response to a receipt of a request message comprising an identifier of the controller device that identifies the controller device sending the request message from other controller devices, a proxy including user interface software with the aid of which the controller device is capable of configuring its user interface equipment to provide a virtual user interface of the electrical device and driver software with the aid of which the controller device is capable of generating the control message on the basis of a control action given through the virtual user interface, which control messages controls the functional elements to carry out the actions defined by the control message received from the controller device, wherein server device is one server of plural server devices having respective memory devices (151, 152, 251, 252, 253, 254) that store data and relay data traffic between the controller device and the electrical device, each said memory device comprising a database storing the respective proxy of each electrical device connected to each of the server devices so that each proxy is stored in at least two distinct servers, the proxies being stored into nested hierarchical groups corresponding to child-parent relationships, with the electrical devices being children and each server being a parent of the child-parent relationships, and wherein the proxy of the electrical device is retrievable from either of the at least two distinct servers upon receipt of the request message comprising the identifier of the controller device that identifies the controller device sending the request message from other controller devices.

* * * * *